(12) United States Patent
Selker

(10) Patent No.: US 8,917,167 B1
(45) Date of Patent: Dec. 23, 2014

(54) HAPTIC DEVICE

(76) Inventor: Ted Selker, Palo Alto, CA (US)

( * ) Notice: Subject to any disclaimer, the term of this patent is extended or adjusted under 35 U.S.C. 154(b) by 433 days.

(21) Appl. No.: 13/290,107

(22) Filed: Nov. 6, 2011

(51) Int. Cl.
  *H04B 3/36* (2006.01)
(52) U.S. Cl.
  USPC .................................... 340/407.1; 340/407.2
(58) Field of Classification Search
  CPC ................................. G08B 6/00; G06F 3/016
  USPC ...................................................... 340/407.1
  See application file for complete search history.

(56) References Cited

U.S. PATENT DOCUMENTS

| 5,825,352 | A | 10/1998 | Bisset |
| 6,979,164 | B2 * | 12/2005 | Kramer ............................. 414/5 |
| 2010/0171719 | A1 * | 7/2010 | Craig et al. .................... 345/173 |
| 2011/0074706 | A1 * | 3/2011 | Son et al. ....................... 345/173 |
| 2011/0121953 | A1 * | 5/2011 | Grant et al. ................. 340/407.1 |

FOREIGN PATENT DOCUMENTS

JP     2002236543 A  *  8/2002

OTHER PUBLICATIONS

Motoyama; Input Device; Publication Date: Aug. 23, 2002; JP2002-236543A Translation; Machine translation by the Japanese Patent Office on Apr. 14, 2014.

* cited by examiner

*Primary Examiner* — Kerri McNally
(74) *Attorney, Agent, or Firm* — Kim Rubin

(57) ABSTRACT

System, method and device to generate user tactile feedback using working fluid inside a sealed vessel, which is vaporized causing a rapid pressure/volume change, then the fluid condenses, restoring original pressure/volume. In one embodiment this sequence is repeated to create a vibration. The sealed vessel is mechanically coupled to a touch surface so the user feels the vibration, typically with a fingertip. In some embodiments a portion of the sealed vessel is also the touch surface. In some embodiments multiple vessels are arranged in an array behind or integral to the touch surfaces.

8 Claims, 9 Drawing Sheets

Control Logic

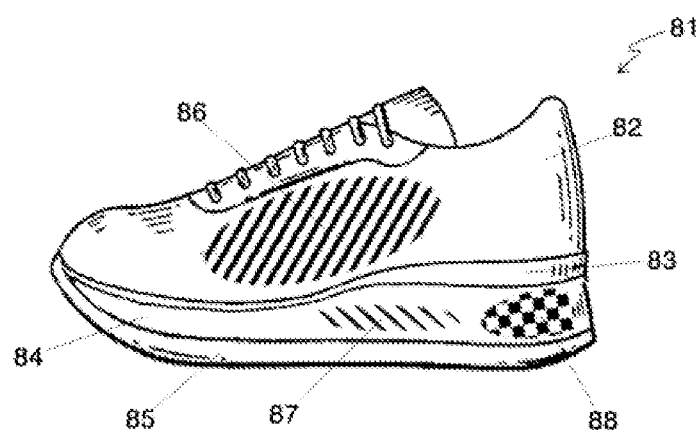
Fig. 11a
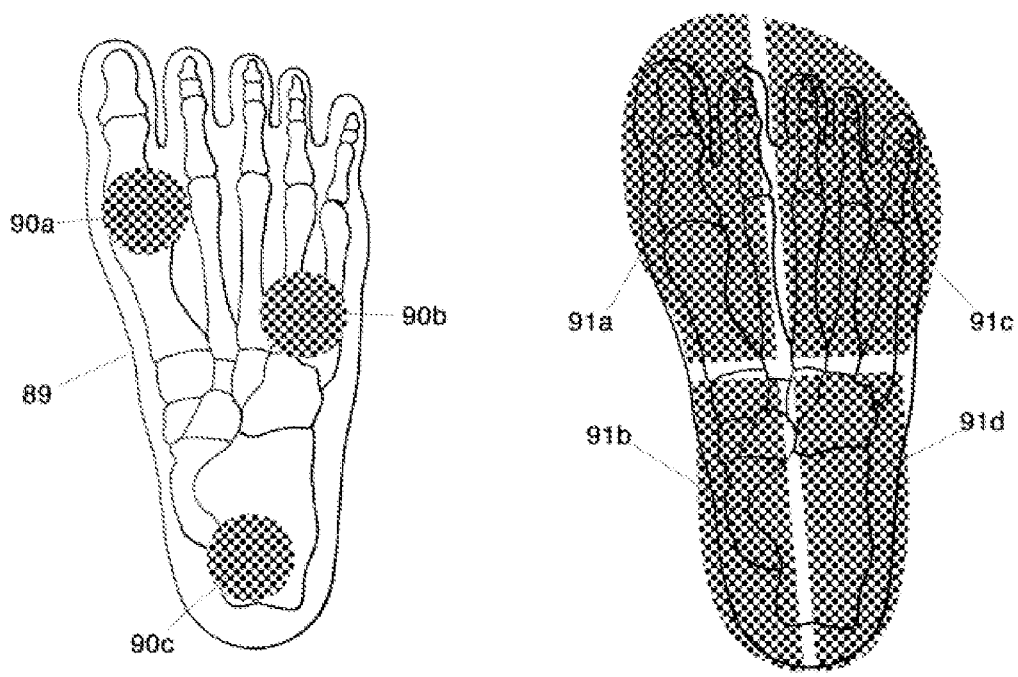
Fig. 11b
Fig. 11c

HAPTIC DEVICE

REFERENCES CITED

A cited reference for this invention is U.S. Pat. No. 5,825,352, Issued Oct. 20, 1998 to Stephen J. Bisset and Bernard Kasser.

BACKGROUND OF THE INVENTION

The designers of electronic devices, in particular mobile electronic devices, strive to create a rich, convenient, fast, and intuitive user interface. Providing feedback to a user who is interacting with a tool or device by the use of one or more fingers in the form of haptic feedback is useful towards these goals.

One form of haptic feedback is a mechanical click, motion, detent, or mechanical click. Most full-size and traditional keyboards provide a nonlinear keystroke excursion that gives this form of feedback. Another form of haptic feedback is a rhythmic shaking or vibration, sensed by a finger, hand, or other part of the body. For example, a fingertip may be used on a touch screen for data-input or feedback. Flight controls include a stick shaker.

One traditional method of generating haptic feedback comprises spinning an out-of-balance weight. Another traditional method comprises an electromagnetic coil, or solenoid, to move an object that the user feels. The movement may be a single movement or it may be a repetitive movement which may be detected by the user as a vibration.

One form of prior art uses a small motor that includes an armature, copper wire winding(s), a rotating shaft, an elliptical or non-symmetric weight, and a power and control source. When the motor turns, the non-symmetric weight is spun or oscillated, which produces a vibration that either directly or indirectly is applied to a portion of the equipment or host device. The user then feels the oscillation or vibration. A disadvantage of this design is startup delay. Another disadvantage with this design is that the range of haptic feedback is limited to a single or small number of fixed frequencies. A third disadvantage is its relatively large size. A fourth disadvantage is relatively high cost that prevents practical applications that involve a large number of haptic devices within one piece of equipment. A fifth disadvantage is poor reliability. A sixth disadvantage is that only regular vibration may be produced.

In one embodiment of the current invention a working fluid inside a sealed vessel is vaporized to create a pressure increase with phase change. The pressure change causes mechanical motion. The working fluid may be vaporized in this way repeatedly, condensing in the intervening time intervals, causing a controlled haptic motion or vibration. There are some similarities of this approach with the method of creating ink droplets in ink jet print heads in which droplets are piezoelectrically vaporized to jump off of the print head or electroresistively heated to vaporize off the head.

In the current invention, in one embodiment, the working fluid is vaporized and condensed repeatedly to create a pressure/volume change with excursion and frequency that may be interpreted by touch or motion sensors in the skin or secondary muscle sensors in the body. This cycle also occurs in heat pipes, for a different inventive advantage.

In portable or mobile electronics, cost, space, reliability and power become major design issues. Advantages of this invention include lower cost, smaller size, more reliable operation, and less power consumption than traditional methods of generating haptic feedback.

SUMMARY OF THE INVENTION

The field of this device includes haptic devices, haptic transducers, haptic technology, and force feedback.

Haptic technology, or force feedback, takes advantage of a person's sense of touch by providing motion, force, or vibration to the person's skin, often a fingertip. This is useful for communicating information from a device to the user. Such information might be that a particular input, such as a key touch or an icon touch, has been received by the device from the user. Haptic technology may be used to provide guidance, including positive and negative feedback. An example of guidance would be providing to a person a haptic sensation that they had a finger over an icon that person might wish to select, or the feeling of traveling on gravel as a user moves a cursor on a graphically path, such as might be useful in a game or navigation system. Positive feedback includes confirmation that an action has been taken. Negative feedback might be indication of an error or failure.

Some examples of applications include any control surface on anything a person uses such as a piece of equipment or car, computers, mobile electronic devices, and devices that use data entry, data selection or a user interface. Additional applications are in the fields of tools, sports equipment, games, medical devices and military applications.

In one embodiment a sealed vessel contains a fluid that is vaporized.

The inventive core of this invention is a haptic transducer that vaporizes a liquid working fluid inside a closed vessel. The increased pressure inside the vessel from the vaporization of the working fluid causes the vessel to expand. The working fluid vapor then condenses back to a liquid, causing the pressure to decrease and vessel to return to its prior size. The expansion and contraction of the vessel is repeated to produce a vibration at a desired frequency. The mechanical expansion and contraction of the vessel is mechanically coupled, either directly or indirectly to the skin of a user, typically but not necessarily a fingertip.

The expansion of the vessel, and the deformation of any coupled object, is normally within the elastic range of the materials of construction. The materials are normally deformed within the range defined by Hooke's law for those materials and construction. Hooke's law, when fully computed, thus defines to the first order the displacement of portions of the vessel due to the pressure increase within the vessel.

It is not strictly necessary for the vaporization of the working fluid be repeated to produce a vibration. A single impulse may be used, or any programmable pattern of physical motions may be created. Vibration is one preferred embodiment.

The vessel, as implemented within a device, will frequently have at least one resonant frequency. Excitation at this frequency (or divisions or multiples of this frequency), that is, the cycling frequency of the transducer, typically produces an efficient coupling of input energy to motion. However, operating in this resonant mode is likely to limit practical operation to one or a small number of frequencies. Operation substantially higher or lower than a resonant frequency may provide the equipment designer with more frequency options and more control of amplitude and effects, including, for example, start and stop time.

Human fingertips are able to distinguish between regular variations in a surface texture such as on fine cloth, and irregular variations such as might occur on the rough surface of a natural stone. By providing a non-regular motion with a haptic device it is possible to simulate a rough surface. Operating away from the resonant frequency of the device improves the ability to control the transducer to produce such a non-regular motion.

One application of this invention is to use it as part of, an attachment to, or inside of a piece of equipment or device, herein called the, "host device."

This invention will sometimes be referred to herein as the, "transducer."

Note that multiple transducers may be used within a single host device.

The vibration may be coupled to the user with no particular preferred orientation, or it may be coupled such that the primary motion is parallel to the surface being touched, which is typically approximately normal to the axis of the fingertip, or it may be coupled such that the primary motion is approximately along the axis of the fingertip. One potential advantage of the parallel to surface motion is that any sound produced by the haptic transducer is generally not directed toward the user. Thus the sound will typically be fainter to the user. A second advantage of generating motion parallel to the surface is that it is easier to construct sound absorbing materials into the host device at the edges of the active surface. One potential advantage of motion normal to the touch surface is that the user may detect the motion more strongly; or, equivalently, that less power is required to produce the same tactile effect. The selection of the axis or axis of primary motion, if any, is a function of the specifics of the design implementation and requirements of the application.

Some non-limiting applications are shown in Table 1.

TABLE 1

Electronic touch surfaces
Touch-screen menus
Data entry
Phones, PDA, GPS, tablets, computers, equipment consoles, using a display screen
Mice, pens, tablets, and non-display data entry surfaces
Menus, typing, scrolling, selecting, etc.
Automotive displays and controls
Point of sale terminals
Wearable items
Shoes, Boots, Sandals, socks inserts for the feet
Helmets, hats, caps, glasses, ear-pieces, neck gear, for the head
Watches, wrist-wearable devices
Jewelry
Control surfaces
Automotive, steering wheels
Flight controls
Joy sticks
Camera controls
Survey type measuring tools, like levels
Robotic controls
Tools
Hand tools, like hammers, screwdrivers, wrenches, etc.
Power tools like saws, nailers, spay painters, etc.
Buttons and control consoles for larger tools, like drills, presses, lathes, etc.
Survey type measuring tools, like levels
Medical tools
Jewelry
Watches, bracelets, neck-wear, etc.
Sports Equipment
Handles of rackets, bats, sticks, poles, (tennis, golf, skiing, etc.)
Boots for skiing, shoes for track or running
Helmets, goggles
Throwable objects, like Frisbees, javelins, etc.
A sports ball or anything that comes in contact with a sports ball
Gun handles, stock and triggers
Games
Game boards
Game tokens
Body games, where you have to step on or touch a location
Electronic game controllers, like Wii
Music and entertainment, including experience enrichment
Medical
For the sensory impaired, vision, hearing, etc.
Devices for pleasure, relaxation, massage, or entertainment
Balance for feet, and sports training
Warning systems, like for heart attack or blood sugar
Military
Warning systems
Gun handles, stock and triggers
Notifications, status
Data coupling of sensors to body
Position information
Application in high noise environments
Applications when absolute quiet is needed
Applications that must work in the dark In some embodiments, a fingertip may be used on a touch screen for data-input or feedback. The inside surface of multiple fingers may be used on a control device such as a steering wheel, stick or joystick. The palm may be included for use with hand and power tools, and sports equipment, such as hammers, saws, measuring tools, tennis rackets, ski poles, rifles handles and triggers, etc. The sole of the foot may be used for both wearable items such as shoes, socks, boots, and inserts as well as non-wearable items such as diving boards, games, and dance floors. Indeed any change in position that may be sensed as motion, be it rhythmic or episodic, might be sensed for information transfer, feedback or entertainment. Other body parts may be used, too. As well as giving feedback the haptic feedback may used to enrich an interactive or music listening experience. In some cases, the vibration may be detected by the user as an apparent change in the texture of the surface. The haptic feedback may produce an undesirable noise, such as a hum, click, whine or buzz. In some application, such noise may be irrelevant or may be desirable to supplement the desired tactile feedback to the user. Equipment and user interface designers may prefer that the haptic feedback only communicate by touch to the users, and thus be as silent as practical.

Haptic feedback may change the character of a surface. For example, it may change a surface from smooth to rough, or sticky to non-sticky, or vice-versa. A person's fingertips in conjunction with their brain are capable of detecting a wide variety of surface types or assigning a wide variety of names to surface textures. Most people can generally identify rubber, plastic, metal, cloth, fur, glass, paper, and wood, etc. by touch. A person trained in the art can often identify different types of cloth by touch. Haptic feedback has the ability to modify, simulate or mimic surface textures.

In one embodiment of this invention the haptic device is placed in a shoe. The wearer of the shoe is the user who experiences the haptic feedback through the soles of his or her feet. This embodiment is useful to provide navigation information when vision is impaired, such as for a blind person navigating city streets or a person walking around a house in the dark, or a soldier who wishes to move unseen. In this embodiment the haptic feedback may be used both for positive feedback and negative feedback. Positive feedback might be that the user is moving on a planned or safe path. Negative feedback might a warning of danger or a deviation from a safe or planned path. Other sensors, such as GPS, artificial vision systems, inertial guidance, a compass, stored path information, or radio or infrared signaling or combinations may be used in conjunction with the haptic device, the shoe, and a power and control means to provide a complete implementation of a useful user device.

In yet another embodiment the haptic device is placed in a shoe. A sensor is used to indicate that the user is off balance or is about to fall. Haptic feedback is used both as a warning and as a means to increase sensitivity and awareness of position of the user's feet in order to assist the user in restoring balance.

In one embodiment a shoe containing a haptic device is connected to a control device and a sensor that detects when the wearer of the shoe is unbalanced, about to fall, or is falling. The control device activates the haptic device, which in turn informs the user of this condition via the user sensing the mechanical action of the haptic device through the wearer's foot, or feet. The warning serves two purposes. First, the warning may enable the wearer to regain his or her balance in order to avoid potential injury. Second, by mechanically activating the nerves in the sole of the foot the wearer's ability to sense balance is improved, aiding in the ability of the wearer to regain his or her balance in order to avoid potential injury. In this embodiment the haptic signal may be applied to one or to both feet. One advantage of applying the haptic signal selectively to one foot or to part of one foot is that this selectivity provides additional information to the wearer indicating the best mode of regaining balance. For example, the haptic device may be activated only for the foot that should be moved to regain balance. In another example, the haptic device may be activated on a portion of the foot to indicate either a particular muscle or a particular direction that the user or the foot should be moved to regain balance.

BRIEF DESCRIPTION OF THE DRAWINGS

FIGS. 11a, 11b and 11c show one embodiment involving a shoe.

DETAILED DESCRIPTION

Figure 2:
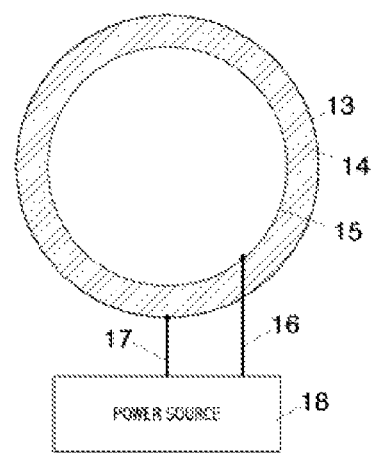
FIG. 2 shows a cross-section of the closed vessel including a power supply for a heater.

While the designs taught in this patent do not limited the frequency of vibration, or even required a fixed frequency of operation, one preferred embodiment generates haptic feedback designed to be perceivable with the physiological sensing humans have for touch. One preferred embodiment frequency range is approximately 3 Hz to 100 Hz. One preferred embodiment frequency range is additional approximately 5 Hz to 20 Hz.

The transducer should be engineered to meet the following ideal criteria: as small as possible where its output is quickly detected by the user; low energy; low power, low cost; easily manufactured in volume; reliable; and preferably made with non-toxic materials.

The vessel may be made out of any material that encloses the working fluid in both liquid and vapor state without leaking, degradation or damage. Such a material for example, may be metal, plastic or composite. The spring constant, as used in Hooke's Law, and stiffness of the materials, are important for any specific design. A preferred metal is stainless steel and the preferred plastic is polyethylene, however a very wide range of materials, including composites, are appropriate based on specific attributes desired of the invention and available manufacturing techniques. For example, glass may be used in a possible integrated manufacture with a touch screen. An important attribute of the vessel material is that it is elastic over the working range of the device.

Many working fluids are possible, including fluids that are commonly used in heat pipes and as refrigeration fluids today, including water, ammonia, acetone, chlorofluorocarbons, methylene chloride, and alcohols. The preferred working fluid is water, which may have additives, such as anti-corrosion additives, lubricants, emulsifiers, electrical conductivity enhancers, stabilizers, or buffers, to improve performance of the invention.

We teach three identified methods of vaporizing the working fluid, without limitation or restriction to these methods. The first method is to use a pair of electrodes, where the electrodes pass a current through the working fluid, and this current causes the liquid working fluid to heat up and vaporize. The second method uses a resistive element that heats up when a current is passed through it. The resistive element then transfers heat directly or indirectly to the liquid working fluid, causing it to vaporize. The third method uses a piezoelectric transducer to directly vaporize the liquid working fluid.

One electrode may be the vessel itself, or a conductive layer added to the inside of the vessel. One electrode may be a mesh, or conductive material added to a fabric. A mesh electrode or conductive fabric may be used to assist in the condensing and transport of the working fluid from its point of condensation back to a location within the vessel suitable for re-vaporization.

The vessel need not be of uniform material, shape or thickness. The preferred embodiment of the vessel provides for a more rigid portion that expands minimally and is not efficiently coupled to the user and a less-rigid portion that is predominantly coupled to the user. The movement of this less-rigid portion provides the majority of the mechanical expansion of the vessel.

The vessel may normally operate at normal air pressure (approximately one atmosphere), or at a higher pressure, or a lower pressure.

Note, however, that unlike most heat pipes, it is not necessary to have the working fluid's boiling point close to the operating temperature of the host device, which is the primary purpose is using low pressure or vacuums in heat pipes, because the means of vaporization in this invention provides for either heat vaporization or piezoelectric vaporization at a higher localized and instantaneous temperature than the working temperature of the host device.

In one embodiment, the working fluid, when in a liquid state, fills the majority of the vessel. This has the advantage of the smallest practical volume for the transducer.

The shape and coupling of the vessel in a preferred embodiment designed to transmit the force in a direction that is approximately parallel to the touch surface. A spherical chamber might be used if it is advantageous to couple vibration to a side of a device that is transverse to it and simultaneously couple the top and bottom of the device to motion that is transverse to it. Such coupling/support system would mechanically separate out the motions for the control surface while allowing the contained explosive expansion to be isotropic.

An embodiment alternatively comprises a pocket between two larger sides that use an arm or other mechanical coupling to transmit the diaphragm surface motion to impart force and motion as required.

In one embodiment the vessel is elongate such that the force of the vaporization of the working fluid first impacts the sides of vessel in the short axis, then the force travels down the elongate axis of the vessel. In this embodiment the first force, along the short axis, is the primary output of haptic device.

In yet another embodiment where the vessel consists of crossed grooves in two adjoining surfaces, the first force impacts the proximal sides of the grooves. In this embodiment the first force, impacting the proximal sides of the grooves, is the primary output of the haptic device.

Figure 1:
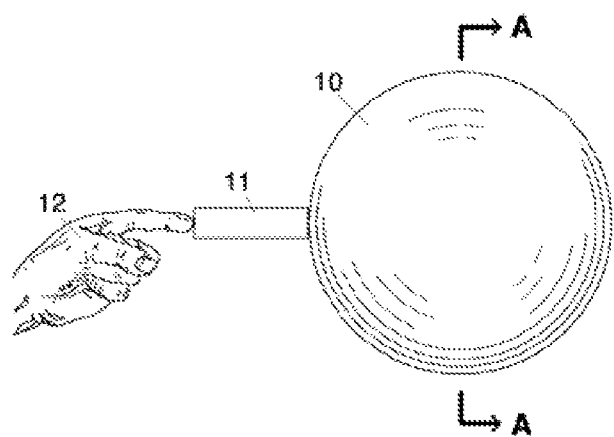
FIG. 1 shows one embodiment with the closed vessel coupled to user's finger.

Improvements on prior art include:
(a) Faster response time for both start and stop
(b) Lower cost
(c) Simpler
(d) More reliable
(e) More versatile implementation
(f) Easier to manufacture in quantity
(g) Easier to simultaneously manufacture a group to be used within a single host device
(h) Quieter
(i) More rugged: more shock resistant
(j) Easier to direct the haptic pressure in designed directions
(k) Easier to make an array of them
(l) Permits non-regular output Refer now to FIG. 1. A closed vessel 10 contains a working fluid 23. The fluid may be water, alcohol, or any of many other fluids. The fluid may have additives, such as corrosion inhibitors. Ideally the fluid is inexpensive and non-toxic. It needs to be a liquid in the vessel at room temperature and ideally over the operating range of the host device, however the vessel may operate at a pressure considerably higher or lower than atmospheric pressure.

A means is provided 11 to operatively couple motion of the vessel to a user's finger 12. This means may include a touch-screen, a key on a keyboard, other data-input or data-output devices, intermediate coupling means, or a combination. Ideally this means is simple, low-cost, lightweight, and small. In one embodiment it might be a sheet of plastic. In another embodiment it might be a layer of adhesive. In another embodiment part of the vessel consists of a portion of a touchscreen, and so in this embodiment the means is the touch-screen itself.

The motion of the vessel to be operatively coupled to the user's finger 12 is either a single pulse or a vibration, which might vary in frequency.

In operation the working fluid in the vessel is vaporized by a heater, a PZT impact, or by other means. The vessel, or part of the vessel itself may be the heater or a PZT.

For example, in one embodiment, a PZT is be deposited on or bonded to the back of a touch screen where either the PZT or the back of the touch screen or both is shaped to provide an enclosed space that constitutes the vessel and includes the working fluid.

A cross-section of the vessel 14 is shown in FIG. 2. Vessel 10 and vessel 14 are the same vessel, in two views. Although the vessel is shown as spherical in the drawings, no prescribed shape is required. In practice, a wide range of shapes will be implemented depending on design and manufacturing details, cost and convenience. The exterior surface 13 and interior surface 15 are shown. In one embodiment these surfaces conduct, due to a metallic or resistive plating, or other means. In this embodiment a power-supply 18 is shown electrically connected 16 and 17 to the inside and outside conducting surfaces respectively. Applying power from the power supply causes the working fluid (23, shown in FIG. 4; not shown in FIG. 2) to vaporize. This means may be via an electrical resistive heater, a spark, a PZT impact, or other means. In one embodiment a resistive heater is deposited using a thick or thin film. In another embodiment a spark gap is used to create a spark. There are many ways to provide a sufficient amount of energy to vaporize the working fluid as one trained in the art will appreciate.

Figure 3:
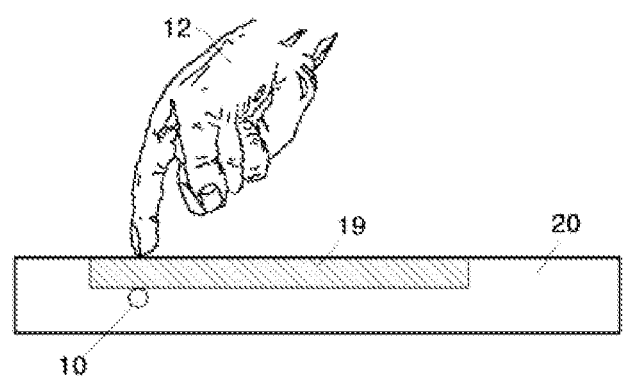
FIG. 3 shows one embodiment as a cross-section view in a host touch-screen device.

FIG. 3 shows a side view of the device 10 configured in a host touch screen device 20. When the user touches the touch screen 19, control logic (39, shown in FIG. 8.) activates the device, which provides haptic feedback to the user's finger 12.

Figure 8:
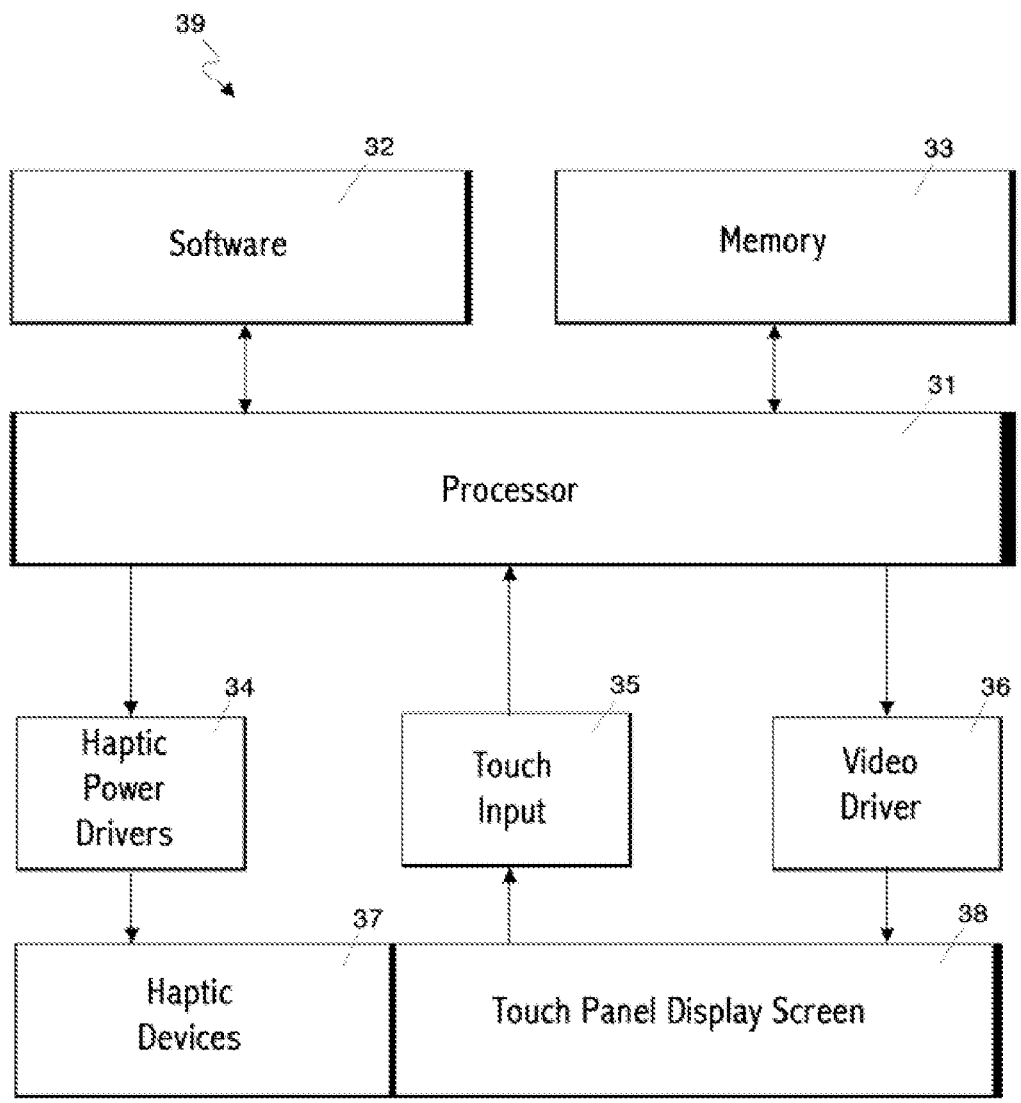
FIG. 8 shows one embodiment of the logic for a host device, including the logic to turn on and off the haptic devices of this invention.

Control logic, FIG. 8 typically comprises a processor 31, memory 33 and software 32. Such logic is commonly found in cell phones, smart phones, PDA devices, tablets, and other consumer electronics and commercial and industrial user interface devices. Such interface devices 20 are shown in FIG. 3. Such control logic might be embedded in a device used primarily for data input, such as a keyboard, graphics tablet, joystick, or gaming controller. Such control logic might be embedded in a device used primarily for data output, such as video display or kiosk display.

The haptic feedback serves a wide range of purposes. For example, it provides an indication that the user's input has been received. It provides an indication that the input is acceptable and some operation will occur. It provides an indication of error. It provides an indication of one type of input as compared to a different type of input. It may provide an indication of a warning or request.

The haptic feedback may be in the form of pulse, due to a single vaporization then condensing cycle. This pulse might replace a more expensive, slower, or heavier type of feedback, such as a key click on a keyboard. It might provide a more direct or quieter feedback than an audio feedback.

The haptic feedback may be in the form of a vibration, which might be sub-audio, such an in the frequency range of 3 to 20 Hz, or it may be in the audio range of 30 Hz to 20 KHz, although the most effective audio range is approximately from 300 Hz to 3 KHz.

The vibration is created by repeatedly cycling vaporization and condensation within the vessel.

Figure 4:
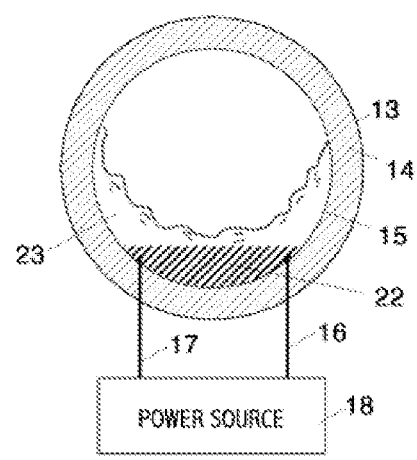
FIG. 4 shows one embodiment with a heater interior to the vessel.

FIG. 4 shows an embodiment with a heater 22 inside the vessel 14. The working fluid 23 is shown. Note, however, that due to surface tension and the small physical size the working fluid may coat the inside surface of the vessel, or otherwise take a shape not determined primarily by gravity, including filling or nearly filling the vessel. The heater 22 is shown interior to the vessel, in this embodiment. The heater may be external to the vessel, or part of the vessels, particularly if the vessel is capable of passing the heat from the heater through the body of the vessel 14 quickly. Although the working fluid is shown in contact with the heater this is not a requirement because the heater will heat the entire interior of the vessel and the walls of the vessel. The shape of the heater shown is not a limitation of this invention. For example, the heater may comprise one or more thin film resistors deposited on the inside surface 15 of the vessel or the outside surface 13. The heater is activated by the power supply 18 electrically connected 16 and 17 to the heater. The heater 22 may be alternatively any means to vaporize the working fluid, such as a spark gap or a PZT.

Figure 5:
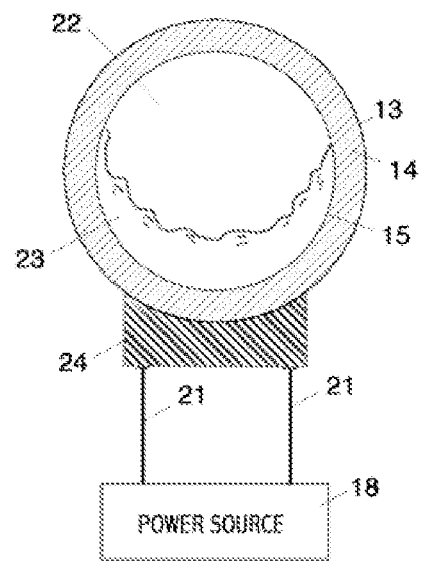
FIG. 5 shows one embodiment with a heater exterior to the vessel.

FIG. 5 shows a cross section of the vessel 14 similar to FIG. 4 but in this embodiment the vaporization means 24 is external to the vessel. This means is not exactly the same as the means 22 shown in FIG. 4 because a spark gap is not appropriate heating means external. Otherwise operation is similar to previously described for FIG. 4.

Figure 7:
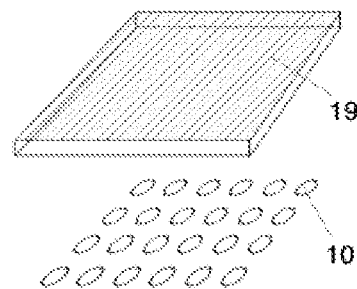
FIG. 7 shows an exploded view of an array of sensors underneath a touch screen.
Figure 6:
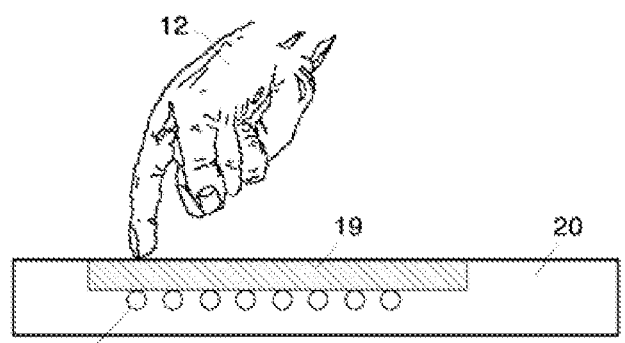
FIG. 6 shows one embodiment as a cross-section view of an array of devices in a host touch-screen device.

FIG. 6 shows a side view an array 10 of haptic devices 10 located underneath a touch surface 19 in a host device 20. This array may be a linear array or a two-dimensional array. The array need not be rectangular or regular in layout. FIG. 7 shows an array, in this embodiment a two-dimensional array in an exploded view with the touch surface 19 shown above the array of devices. In operation a demultiplexor would direct the electrical signals to the heaters or other vaporization means of the desired device in the array. Such demultiplexing means are well know to one trained in the art.

If a single finger 12 is touching the touch screen, then generally only a single haptic device of the array need be activated. If more than one finger is touching the touch screen it may be desirable to activate more than one haptic device in the array at the same time, or closely spaced in time.

With one finger only touching the touch screen there may be reasons to activate more than one device. For example, activating multiple devices at once might produce a more pronounced haptic effect, similar to a volume change.

In one embodiment haptic elements of the array are activated in a sequence such that as the mechanical wave from one haptic element passes another element that element is activated so as to amplify the mechanical wave. In this way, a pulse or wave may be amplified by the use of multiple, synchronized activations. This mode allows the haptic devices to be smaller and cheaper for the same level of effective haptic feedback to the user. Consideration of the location of the user's finger on the touch surface is particularly advantageous so that the control logic can direct the sequence and selection of haptic element activations so as to maximize the haptic effect at the finger location.

In one embodiment, a user's experience using such a system causes a person to feel that the haptics are coming from some direction and move his or her finger towards or away from that source. These variations in intensity might be used to provide more than one type of feedback. For example, the milder effect might be used as a simple acknowledgement of a user input while the more intense effect might be used to indicate an error.

In another embodiment, activating more than one haptic device of this invention provides a higher frequency of vibration, buzz or tone. Each device has a minimal cycle time, which is a function of the design and possibly operating temperature. Therefore, one way to achieve a higher frequency, say double the available frequency from a single device, is to operate more than one device in a phase locked way and possibly out of phase or creating motion and feedback in more than one direction.

FIG. 8 shows one embodiment of the aggregate logic and controls 39 for a host device including the logic to drive the haptic devices in this host device. This includes a processor 31 with memory 33 running software 32. The software typically includes an operating system with internal drivers, and API, and application code. There are many variations to the implementation of the processor, software memory, and haptic drivers, as one skilled in the art will appreciate. For example, the processor might be general purpose, a logic core, hardwired logic, or other implementations. The haptic drivers 34 may be discreet devices, components within another integrated circuit, or simple I/O pins, as well as other implementations. Traditionally the software to driver peripherals, including the haptic devices of this invention are provided by drivers and these features are used both the operating system and made available to applications via an API. However, as people trained in the art appreciate, there are substantial variations and modes of implementation including options in hardware, firmware and software. The memory may take many physical forms including DRAM, SRAM, NVRAM, memory cards or sticks, separate chips or modules, or fully integrated into a chip used for more than one function. The haptic devices 37, which may be single or in an array are driven by electrical drivers 34 under the control of the processor and software. The haptic devices are operatively mechanically coupled to a touch surface 38, in this embodiment, which is driven by video drivers 36 under the control of the processor and software, and also the touch screen provides touch input sensing via the touch input circuitry 35 to the processor and software. People trained in the will recognize the options and implementations available.

Figure 9:
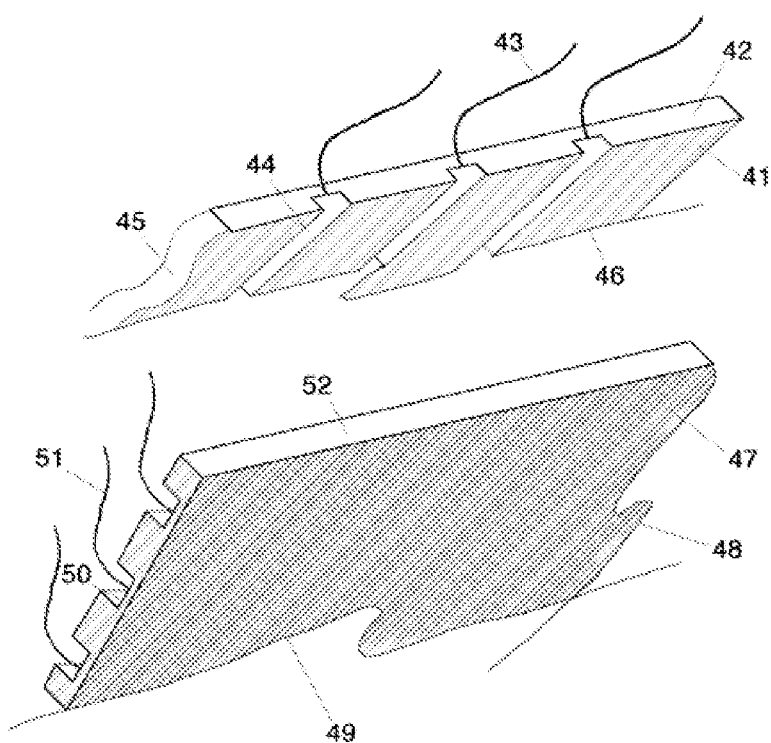
FIG. 9 shows one embodiment with crossed grooves in two plates.

FIG. 9 shows one embodiment comprising two plates with perpendicular grooves. Although as few as a single grove in each plate may be employed, in which case a single haptic point transducer is created, the preferred embodiment uses a plurality of grooves on each plate to create an X-Y array of intersecting groove points. The grooves contain a working fluid, and are sealed on the ends to contain the fluid. The plates are attached to each other in such a way as to contain the fluid within the grooves. Attachment might comprise glue, epoxy, frit, pressure, use of gaskets, or other means. The grooves contain a metal liner or plating, or another conductor on the interior surface of each groove. The conductive portion of each groove is connected to a wire. By applying a voltage from a selected wire from the first plate to a selected wire on the second plate a current is caused to flow across the thusly-selected point where the two corresponding grooves cross. This current causes heat, which causes the working fluid to vaporize at this location. We call this action at a single point a trigger or activation. The expanding fluid causes an expansion of at least one plate proximal to the vaporization, which produces a mechanical impulse, which is a haptic effect. This process may be repeated at the same point or at different points in order to create a vibration.

The vibration may be a series of impulses, or waveform more closely sinusoidal or triangular in shape. The sequencing of triggers in both space and time may be such that a wave travels through at least one plate. The wave may be a pressure wave or a surface save. In this case the sequencing of the triggers is selected so as to amplify the wave as it moves across the device. A similar but alternative embodiment sequences the triggers to amplify a standing wave, using a reflection from at least one edge of at least one plate to create a standing wave. Note that there is no requirement to sequences the triggers relative to any wave or wave propagation. A sequence of triggers may be timed so as to produce a vibration of a desired frequency, where the frequency or frequencies is set by the repetitive timing of the triggers. The sequence of triggers may be specifically not-regularly timed, or timed randomly or arbitrarily specifically to avoid wave amplification or standing waves.

Although we refer to an X-Y array, there is no requirement that the plates be rectangular, have straight edges, or in fact have any particular shape at all. The grooves on the two plates do not have to be perpendicular, however this is a preferred embodiment. The grooves on the first plate need only cross the grooves on the second plate. The grooves do not have to be straight, however this is a preferred embodiment. The grooves are shown in the figure as rectangular in cross section, however the shape of the cross-section of the grooves is likely to vary based on manufacturing convenience and the requirements of the application. In particular, grooves with curved bottoms may provide increased strength and improved conductive plating of the plates in some applications.

Referring now to FIG. 9., 41 identifies a first plate, which may be called a top plate, but no particular orientation or stacking order is required or implied. 42 identifies an edge of the first plate. 43 identifies one of the plurality of wires connected to the conductors in the grooves 44 of the first plate. 44 identifies one of the grooves in the first plate. Three groves are shown in the figure, however, there may be any number of grooves. 45 identifies a wavy line to indicate a typical continuation of the plate. 46 identifies another wavy line to indicate a typical continuation of the plate on a perpendicular edge to edge 45. 47 identifies a second plate, which may be called a bottom plate, but no particular orientation or stacking order is required or implied. 48 shows a wavy line to indicate a typical continuation of the plate. 49 shows a wavy line to indicate a typical continuation of the plate in a direction perpendicular to edge 48. 50 identifies a groove that will cross one of the grooves 44 on the first plate, when the two plates are assembled. 51 identifies one of the wires that connect to the conductors in grooves 50.

Figure 10:
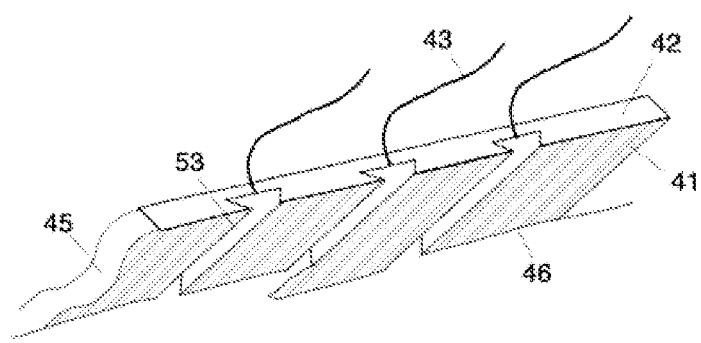
FIG. 10 shows part of one embodiment using dovetail grooves.

FIG. 10. shows dovetail grooves, 53. It is often desirable to generate the maximum amount of mechanical motion from the haptic device parallel to the plane of the touch surface, rather than normal to the plane. This minimized the audio sound, allowing the haptic feedback to be "silent." Depending on the application, various groove shapes as well as mechanical couplings to the touch surface are preferred. In one embodiment, the portions of the vessel that lie perpendicular to the desired direction of transmitted motion should be optimized relative to the portions of the vessel that lie perpendicular to the undesired direction of transmitted motion. A dovetail groove shape is one means of maximizing mechanical motion along a plane parallel to the surface of the touch screen. Another means is to design the stiffness of portions of the vessel so that those portions where the transmitted motion are to be maximized are most closely matched in stiffness and resonant frequency to the impulse generated by the vaporization. That is, maximize the coupling from the force of vaporization into the preferred direction of motion, while minimizing the coupling in non-preferred directions by having unmatched stiffness or resonance on those portions of the vessel.

In various embodiments an associated or integrated touch surface is not flat. Alternatively, more than one touch surface may be used on a device. For example, a device in the shape of a cube might touch surfaces on multiple faces of the cube. A device used as musical instrument, as one example, might have multiple, complex curves as touch surfaces. These surfaces might be either concave or convex. Touch surfaces may be firm or may be flexible.

In general, the goal is to provide least amount of working fluid in the sealed vessel(s) as necessary to provide the desired haptic effect over the expected operating range of the device.

The primary goal of this device is to create vibration on a control surface to use as feedback for a user of a device like a touch screen. However, note that a single pulse or a number of pulses may be used instead of a vibration.

We refer in the claims to a vessel that "expands." The purpose of the expansion is to provide a force, which in turn causes the control surface to move enough to be felt by the user. In a practical sense, it may be more convenient to deal with energy and forces, rather that motion measured linearly.

In one embodiment the haptic device is placed in a shoe. By providing the wearer of the shoe with tactile feedback on the foot, nerve sensitivity and balance may be improved. There are two primary modes of operation in this embodiment. In the first mode, the haptic devices provide low-level stimulation which improves overall sensitivity and balance. In the second mode, high-level stimulation is provided as a warning, encouragement or motivation for the wearer to shift balance in order to avoid a possible fall. Continuous levels of operation between these two operating modes is a preferred mode. For operation in the first mode, pressure sensors are not necessary: the haptic device(s) may be left on, or modulated by another means, such as via a timer or switch. For operation in the second mode, pressure sensors or other balance sensors are used to determine if the wearer is off balance. There are many possible such sensors. We describe one embodiment where pressure sensors are placed in the shoe under the foot.

FIGS. 11a, 11b and 11c show an embodiment of the haptic device in a shoe. FIG. 11a shows a side view of the shoe. 81 is an exemplary left side of a right shoe. A similar left shoe is not shown. The shoe upper 82 may contain an antenna 86. The antenna 86 may communicate with the other shoe, or to another device. For communication with the other shoe, the inside surface of the shoe is preferred for the antenna location. It is also possible, by the use of a bare foot or a conductive sock to use the wearer's body as an antenna. This mode is particularly advantageous to not only create a larger antenna than the shoe, but also for communicating with a device close to the user, such as wireless headset, handheld phone or tablet, or an automobile. Many wireless communication modes are possible, such as electromagnetic, Bluetooth, near-field communication, or proprietary. A large antenna and the close distance of the two shoes permits very low power communication, particularly shoe to shoe. In some embodiments, communication is not necessary, as each shoe provides stand-alone functionality. 83 is the upper sole, which may contain the haptic devices 91a thru 91d. 84 is the mid-sole, which may contain the control electronics 87 and the power source 88. The power source may be a replaceable or rechargeable battery, accessible via the heel of the shoe. The midsole 84 may contain the pressure sensors, or they may be placed in the top sole underneath the haptic devices. 85 is the bottom sole of the shoe.

FIG. 11b shows possible placement of pressure sensors looking down at an exemplary right foot 89. Three sensors 90a, 90b, and 90c may be used to determine balance of the wearer forward and back, and left and right. Sensor 90a, approximately under the ball of the foot, detects weight forward and inside. Sensor 90b detects weight towards the outside of the body. Sensor 90c detects weight on the heel.

FIG. 11c shows one possible placement of the haptic devices under the foot. The haptic devices may be segmented in various ways, with one segmentation embodiment shown. Segments 91a and 91b on the left side of the right foot warn of balance too far to the left. Segments 91c and 91d similarly warn of balance too far to the wearer's right. Segments 91a and 91c warn of balance too far forwards. Segments 91b and 91d warn of balance too far back. All segments may be activated at a low level to assist in improving nerve sensitivity and overall balance.

The control logic 87 in the midsole 84 provides the necessary electronics to drive the haptic devices. It also provides the interface and signal conditioning from the pressure sensors. It also provides the necessary power management from the power source 88. It also provides one-way or preferable two-way wireless communication via the antenna 86, if communication is used. Various methods to determine the wearer's balance are possible. One method uses simple pressure distribution. If the pressure from the sensors is not balance for a normal, healthy person standing or walking, then a warning may be provided. A preferred embodiment is to compute dynamic predictive balance. One such method is to create a set of calibration profiles, based on the average or aggregate data from a set of wearer's or from pressure profiles generated from the single wearer of the shoes. By dynamically comparing the current time-based pressure changes from the pressure sensors against the stored profiles. When a balance problem is predicted, typically within the future time window of 0.1 seconds to 3 seconds, the haptic devices are turned on or the amplitude increased as a warning and encouragement for the wearer to immediately correct his or her balance.

Power source 88 is ideally placed near the heal for easy external access. The power source may be user replaceable, such as batteries or a battery pack. The power source may be sealed inside the shoe, using electromagnetic coupling for charging (not shown).

Note that for FIGS. 11b and 11c that the preferred physical "stacking order" is pressure sensors on the bottom, then haptic devices, then skin, then bones of the foot.

Additional embodiments are listed below:

AA. A method of providing tactile feedback to the user of a touch surface comprising the steps of:
  vaporizing a portion of working fluid in a sealed vessel that transmits force through a connecting means to the touch surface;
  condensation of the vaporized working fluid;
  repeating the first and second steps regularly to create a vibration at the touch surface.

BB. A method of providing tactile feedback to the user of a touch surface comprising the steps of:
  vaporizing a portion of working fluid in a sealed vessel wherein a portion of the sealed vessel is also a portion of a touch screen that includes the touch surface;
  condensation of the vaporized working fluid;
  repeating the first and second steps regularly to create a vibration at the touch surface.

CC. A user device containing a haptic device wherein the user device comprises a first and a second mechanical connection from the haptic device to the user device, wherein:
  the first and second mechanical connections are adapted to transmit a mechanical action of the haptic device through the user device to a portion of the user's body wherein the portion of the user's body is in contact with a first and a second portion respectively on the user device;
  the user device is adapted to transmit the mechanical action of the haptic device to a portion of the user's body when that portion of the user's body is in contact with a first position and a second portion the user device;
  the first mechanical connection provides the mechanical action sensed by the user through the first portion of the user device and the second mechanical connection provides the mechanical action sensed by the user through the second portion of the user device.

DD. A shoe adapted to wear on the foot of a user wherein the shoe comprises a haptic device and control logic wherein:
  the shoe is comprises a mechanical means to transmit the mechanical action of the haptic device to the foot of the user;
  the control logic activates the haptic device in response to a signal from one or more sensors.

EE. The shoe of embodiment DD wherein at least one of the sensors is a balance sensor that indicates a loss of balance of the user.

FF. The shoe of embodiment DD wherein the shoe, haptic device, control logic and at least one sensor are adapted to provide the mechanical action of the haptic device selectively to a portion of the user's anatomy so as to indicate a desired response by the user to regain the user's lost balance.

DEFINITIONS

"Below a critical angle of audio propagation"—There is wide latitude in this angle, whose restrictions are primarily from the limitations of manufacturing and the thickness of the touch screen. Angles from about 15° to 75° are included in this definition.

"Control surface"—The surface on a user device touched by the user.

"Epsilon of the surface area"—The surface area in common between the closed vessel and the back of the touch screen may be divided into an arbitrary number of such "epsilon" areas. The sum of all epsilon areas is equal to the area in common. The area of each epsilon may be reduced to an arbitrarily small number by the use of differential calculus without changing the effect of maximizing the stated numerical product in the claim.

"Portion of working fluid"—The portion of the working fluid may include all of the working fluid as a maximum. As a minimum, a sufficient amount of working fluid must be vaporized to cause the desired haptic effect.

"Proximal vaporization element"—the vaporization element may be inside, part of, or outside the corresponding vessel. One such means is an electrically resistive heating element, one example thereof is a conductive material deposited on a ceramic substrate. Another such means is a piezoelectric transducer, which may be external, internal, or part of the sealed container.

"Regular, non-regular, periodic"—A distinction is made between "regular," or "periodic" output of a haptic device, such as is produced by spinning an off-balance weight, and a series of vessel expansions or impulses, which are spaced in time at irregular intervals. We refer to this latter mode of operation as "non-regular" output. Note that regular or periodic oscillation or vibration may not be at a fixed frequency. For example, a motor may have to spin up to speed, then spin down.

"Shoe"—Any article adapted to wear on or under the foot of a human, such as a shoe, boot, sandal, sock, sock, or orthotic, or a medical device adapted to be in contact with the foot of a human, such as cast, brace, weight scale or mat.

"Touch surface"—a portion of a user device from which the user receives the haptic feedback. One example of a touch surface is a touch screen. For example, the said touch screen may be a simple button, or a portion of a static labeled surface, or a portion of another user device such as a mouse, joystick, control stick, steering wheel, pen, tool or handle. It may be a piece of sports equipment or clothing accessory, such as a racquet handle, golf club handle, ski, shoe, helmet or watch.

"User device"—A device or piece of equipment containing a control surface or an information surface. Examples without limitation include vehicles, computers, mobile electronic devices, gaming devices, medical devices and medical equipment, control consoles, dashboards and cockpits, direction finding or direction communicating devices, computer mice, keyboards, touch screens, tablets, consumer appliances, kitchen appliances, game surfaces and devices that use data entry, data selection, data display, data communication or a user interface. Additional examples without limitation include clothing accessories and medical devices in contact with the user wherein the accessory or medical device comprises a haptic device and control logic to communicate data to the user or patient.

"User"—A person who is using the device.

"Vibration"—A mechanical motion which may be regular and periodic, at some frequency, or may be non-regular, such that the time interval between the repetitive motion varies. Vibration does not need to be sinusoidal.

"X-Y array"—a set of lines, grooves, or conductors, such that the individual elements of the X set are generally distinct and the individual elements of the Y set are generally distinct and the X set and the Y set cross so as to create a two-dimensional array of cross-points. The array may be approximately rectangular. The array may be polar. The array may be substantially not organized according a recognized coordinate system such as the use of wavy elements, or the elements are directed to a selected set of cross-points. For example, on a control surface or keyboard, the elements may be placed so that cross-points are proximal to desired control points, buttons or keys. Such control points, buttons or keys may not be mechanical. Such buttons or keys may be markings or icons.

"User"—A person who is using the device or method.

What I claim is:

1. A device for generating tactile feedback comprising:
   a sealed vessel containing a working fluid;
   a vaporization means;
   a portion of the sealed vessel consists of a rear portion of a visible screen and touch surface;
   wherein the vaporization means vaporizes a portion of the working fluid causing an expansion of the sealed vessel and a compression wave to pass into the visible screen and touch surface; then the vaporized portion of the working fluid condenses causing the sealed vessel to return to substantially its original volume.

2. The device of claim 1 wherein the said vaporization is repeated to create a vibration of the touch surface in the frequency range of 5 Hz to 20 KHz.

3. A device for generating tactile feedback in response to a touch action by a user of a touch surface comprising:
   a visible screen and touch surface;
   an array of sealed vessels, each containing a working fluid;
   an array of vaporization elements wherein each heating element is proximal to each sealed vessel;
   a coupling means to transmit a compression wave from the sealed vessels to an array of corresponding positions on the rear of the visible screen and touch surface;
   wherein the vaporization of one element vaporizes a portion of the working fluid in a corresponding sealed vessel; then the vaporized portion of the working fluid condenses causing the sealed vessel to return to substantially its original volume; and
   wherein a portion of each sealed vessel is also of a portion of the rear of a touch surface, wherein the front surface of the touch surface is the surface used for touching and at least one force-transmitting part of said portion is non-parallel to the touch surface such that the force of the expanding sealed vessel is transmitted preferentially towards the normal vector of the force-transmitting part.

4. A device for generating tactile feedback comprising:
   a touch surface;
   an array of sealed vessels, each containing a working fluid;
   an array of vaporization elements wherein each heating element is proximal to each sealed vessel;
   a coupling means to transmit motion of the sealed vessels to an array of corresponding positions on the touch surface;
   wherein the vaporization of one element vaporizes a portion of the working fluid in a corresponding sealed vessel; then the vaporized portion of the working fluid condenses causing the sealed vessel to return to substantially its original volume;
   wherein a portion of each sealed vessel is also of a portion of the rear of a touch surface, wherein the front surface of the touch surface is the surface used for touching, and the shape of the said portion is selected to minimize the proportion of the said portion that is approximately parallel to the touch surface.

5. A device for generating tactile feedback comprising:
   a touch surface;
   an array of sealed vessels, each containing a working fluid;
   an array of vaporization elements wherein each heating element is proximal to each sealed vessel;
   a coupling means to transmit motion of the sealed vessels to an array of corresponding positions on the touch surface;
   wherein the vaporization of one element vaporizes a portion of the working fluid in a corresponding sealed vessel; then the vaporized portion of the working fluid condenses causing the sealed vessel to return to substantially its original volume;
   wherein a portion of each sealed vessel is also of a portion of the rear of a touch surface, wherein the front surface of the touch surface is the surface used for touching, and the shape of the said portion is selected to maximize the numerical product of the angle of each epsilon of the surface area of said portion from parallel to the touch screen and the area of each said epsilon of surface area.

6. A device for generating tactile feedback comprising:
   a touch surface;
   an array of sealed vessels, each containing a working fluid;
   an array of vaporization elements wherein each heating element is proximal to each sealed vessel;
   a coupling means to transmit motion of the sealed vessels to an array of corresponding positions on the touch surface;
   wherein the vaporization of one element vaporizes a portion of the working fluid in a corresponding sealed vessel; then the vaporized portion of the working fluid condenses causing the sealed vessel to return to substantially its original volume;
   wherein a portion of each sealed vessel is also of a portion of the rear of a touch surface, wherein the front surface of the touch surface is the surface used for touching, and the said portion includes sub-portions whose angle is below a critical angle of audio propagation out of the control surface.

7. A device for generating tactile feedback comprising:

a touch surface;

an array of sealed vessels, each containing a working fluid;

an array of vaporization elements wherein each heating element is proximal to each sealed vessel;

a coupling means to transmit motion of the sealed vessels to an array of corresponding positions on the touch surface;

wherein the vaporization of one element vaporizes a portion of the working fluid in a corresponding sealed vessel; then the vaporized portion of the working fluid condenses causing the sealed vessel to return to substantially its original volume;

wherein the array of sealed vessels comprises an X-Y array of grooves wherein:

the X grooves are approximately parallel to each other; the Y grooves are approximately parallel to each other; the X grooves cross the Y grooves;

the grooves comprise a conductor on the inside surface of the groove;

the conductor of each groove is connected to a control logic;

the control logic is adapted to create a voltage between at least one selected X groove and at least one selected Y groove;

the voltage causes the working fluid at the junction(s) of the selected X and Y groove(s) to vaporize such that the vaporization causes a local pressure wave on the sides of the grooves proximal to the vaporization.

8. A device for generating tactile feedback comprising:

a sealed vessel containing a working fluid;

a heating means;

a coupling means adapted to transmit a compression wave from the sealed vessel to the rear of a visible screen and touch surface;

wherein the heating means vaporizes a portion of the working fluid causing an expansion of the sealed vessel; then the vaporized portion of the working fluid condenses causing the sealed vessel to return to substantially its original volume; and wherein the device provides a plurality of different vibrations to the touch surface in response to an application driving the visible screen.

* * * * *